United States Patent [19] [11] 4,198,145
Scott [45] Apr. 15, 1980

[54] APPARATUS FOR DEVELOPING PHOTOGRAPHIC IMAGES ON AN EMULSION COATED FILM

[75] Inventor: Richard D. Scott, Cherry Hill, N.J.

[73] Assignee: RCA Corporation, New York, N.Y.

[21] Appl. No.: 790,662

[22] Filed: Apr. 25, 1977

[51] Int. Cl.² .................. G03B 17/50; G03D 7/00
[52] U.S. Cl. .................................... 354/83; 354/299; 219/216; 219/388
[58] Field of Search ............ 354/297, 299, 300, 317, 354/319, 339, 83; 34/155, 160; 432/59; 219/216, 388

[56] References Cited

U.S. PATENT DOCUMENTS

| 3,457,075 | 7/1969 | Morgan et al. | 96/67 |
| 3,496,332 | 2/1970 | Lunde | 219/388 |
| 3,585,917 | 6/1971 | Griffith | 354/297 |
| 3,798,790 | 3/1974 | Roman | 34/155 |
| 3,863,360 | 2/1975 | Stievenar et al. | 354/299 |
| 4,052,732 | 10/1977 | Meadows | 354/297 |

Primary Examiner—L. T. Hix
Assistant Examiner—Alan Mathews
Attorney, Agent, or Firm—Samuel Cohen; Joseph D. Lazar; Robert L. Troike

[57] ABSTRACT

An apparatus for developing a fixed photographic image on a light-sensitive, heat-developable emulsion, coated on a surface of a film base. The apparatus comprises a light source to expose the emulsion to an image of light to record a latent image on the emulsion and film support means to support the film by a gas bearing of flowing gas supplied to the emulsion and film base surfaces. The gas bearing is established by spacing the support means with respect to the film such that the pressure of gas supplied to the respective film surfaces supports the film and the film passes through the development apparatus. The support means includes heating means to heat the gas supplied to the film surfaces. The spacing is such that heat is transferred between the heating means and the respective film surfaces essentially by heat conduction to develop the fixed image.

12 Claims, 5 Drawing Figures

APPARATUS FOR DEVELOPING PHOTOGRAPHIC IMAGES ON AN EMULSION COATED FILM

CROSS REFERENCE TO RELATED APPLICATIONS

Of interest is the following copending application, Ser. No. 790,196 filed on Apr. 25, 1977 entitled "Thermal Processor in an Apparatus for Developing Photographic Film", based on the invention of Bohdan Wolodymyr Siryj, Richard David Scott and Charles Richard Horton and assigned to the same assignee as is the present invention.

BACKGROUND OF THE INVENTION

1. Field of the Invention

This invention relates to an apparatus for developing photographic images on an emulsion layer coated on a photographic film base and more particularly to an apparatus utilizing heating elements with forced air flow to establish a gas bearing to support the film and conductively heat the film at high temperatures for rapid image development.

2. Description of the Prior Art

In photographic systems it is often desirable to visually display photographic images in a short time subsequent to the forming of the images on a sensitized photographic surface. Such photographic systems are useful, for example, in reconaissance and weather applications, aircraft and space use and commercial systems requiring fast display response. In these systems, dry development of photographic images on the sensitized film by thermal processing subsequent to exposure of the sensitized surface to light generally can be more time consuming than the exposure process.

In a conventional device for developing photographic images, a light-sensitive, heat-developable emulsion layer such as a dry silver halide is coated on a suitable film base or support. The dry silver emulsion contains photosensitive silver halide, an organic silver salt, and a reducing agent. Exposure to a light-image generates from the silver halide component a catalyst which accelerates the image-forming reaction between the other two components to make possible the subsequent heat development of the visable image. The typical dry silver film development temperature range of these conventional thermal processing devices is about 210°–330° F. (99°–166° C.), and generally the development time is for 30 seconds at 260° F. (127° C.).

Since the photographic film development is a chemical reaction, the development time can be shortened by raising the processing temperature. However, thermal warping and weakening of the base can occur at temperatures in excess of 330° F. (166° C.). Furthermore, contacting the emulsion at a temperature in excess of 330° F. (166° C.) is not desirable since the emulsion is relatively soft and more easily damaged. Thus, standard film development devices utilizing "hot" rollers for thermal processing which contact the emulsion of the film are inadequate for reducing the film development time by use of higher processing temperatures. Moreover, development devices employing thermal radiation or convective heat transfer mediums often lack the control of localized heating and accurate maintenance of temperature levels to satisfactorily provide uniform film development or to effectively reduce the time of film development.

SUMMARY OF THE INVENTION

According to the present invention, an apparatus and a method are provided for developing a fixed photographic image on a strip of photographic film, the film including a light-sensitive and heat-developable emulsion coated on a surface of a film base. The apparatus comprises means for exposing the film to an image of light to record thereby a latent image on the emulsion. Included in the apparatus is means for supplying flowing gas. Also in the apparatus is film support means comprising gas distribution means responsive to the flowing gas for uniformly distributing the flowing gas to the light exposed film at a predetermined pressure. The gas distribution means is disposed adjacent to and on opposite surfaces of the film at a spacing such that the pressure of gas supplied to the respective surfaces of the film is sufficient to establish a gas bearing on the respective film surfaces to thereby support the film while the film is being passed through the development apparatus. The film support means includes heating means for supplying gas to the emulsion surface at a temperature that is at least equal to the temperature of gas supplied to the base surface. The spacing of the gas distribution means is such that heat is transferred between the heating means and the respective surfaces of the film essentially by heat conduction. The heated gas essentially conductively heats the film to develop the fixed photographic image.

BRIEF DESCRIPTION OF THE DRAWING

FIG. 3b is a fragmented plan view of the heating element of FIG. 3a.

DETAILED DESCRIPTION OF THE PREFERRED EMBODIMENT

Figure 1:
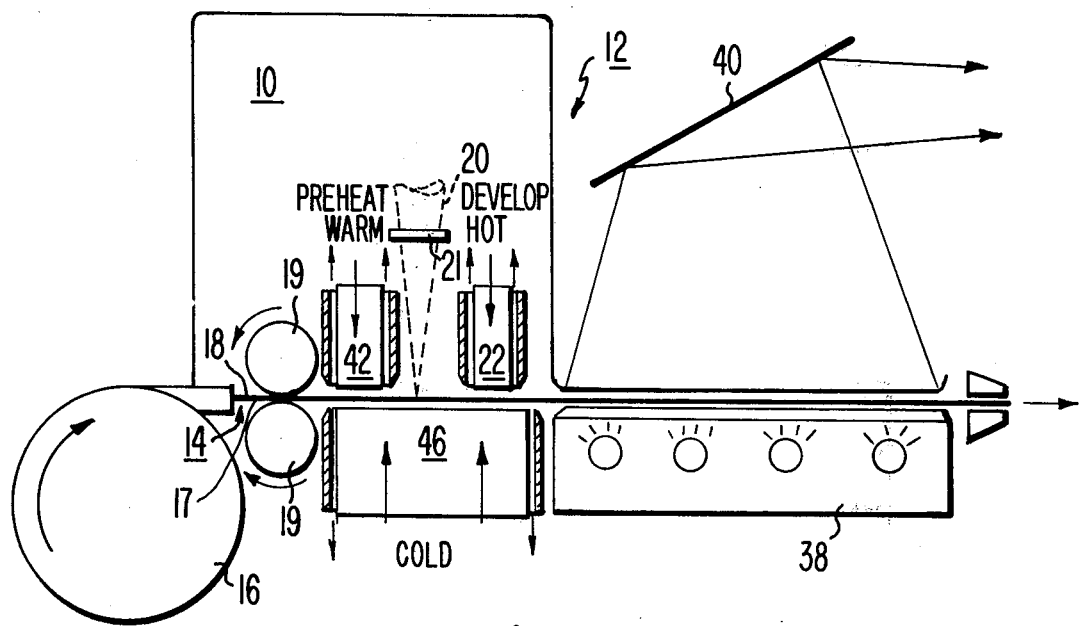
FIG. 1 is a schematic diagram in side elevation, partly in cross-section, of a photographic film development apparatus according to one embodiment of the invention.

Referring to the drawing, there is shown in FIG. 1 a photographic film developing apparatus 10 in a photographic system 12. The apparatus of this invention is generally applicable to any photographic system which is heat-processable and which does not require application of external liquid developing agents. An unexposed strip of photographic film 14 is fed into apparatus 10 from a supply casette 16. Film 14 passes between a pair of drive rollers 19 in apparatus 10, rollers 19 serving as a mechanism to convey film 14 through system 12. According to the invention, a fixed photographic negative image is developed on film 14 in apparatus 10 after exposure to an image of light from source 20, preferably a laser beam by a dry heating process. A positive image may also be developed, in accordance with the invention, by changing the electronic logic to the laser beam light source 20. Gas is supplied to both surfaces 17 and 18 of film 14 by a heater 22 and blower 46, respectively, to provide a gas bearing to support the film and to develop the fixed photographic image by an essentially conductive transfer of heat, as will be explained. Blower 46 may be alternatively arranged to provide cooled or heated gas to film 14 as will be described in detail. However, the desired gas bearing is provided to support film 14 whether heated or cooled gas is supplied by blower 46. Preheater 42 may be used to preheat the film 14 prior to exposure, as will be described. A thermal processor such as described in the above-identified application, Ser. No. 790,196 may be utilized in the film development system of the present invention.

Figure 2:
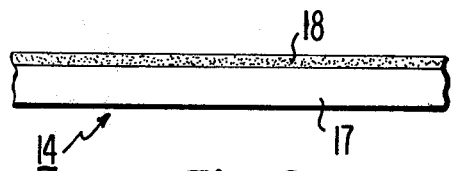
FIG. 2 is a fragmentary side elevation view of a photographic film utilized to practice the present invention.

As detailed in FIG. 2, photographic film 14 comprises a layer 18 of light sensitive and heat developable emulsion coated on a suitable support or base 17. In accordance with a preferred embodiment of the invention, emulsion 18 is a dry silver material comprising an oxidizing agent, such as a heavy metal salt, a reducing agent and a photosensitive component, such as photosensitive silver halide which is believed, as understood in the present state of the art, to be a catalyst for the oxidation-reduction image forming combination. A useful photosensitive material comprises, for example, an oxidation-reduction image forming combination comprising (i) silver behenate and/or silver stearate with (ii) a reducing agent, such as a bis-beta-naphthol and photosensitive silver halide. Other suitable image producing emulsions may, however, also be used.

Emulsion 18 can be coated on a base 17 formed of any of a wide variety of materials according to usual practice. Typical base materials for photographic film include glass, metal, paper, cellulose triacetate, polyethylene terephthalate and film bases having high heat-distortion temperatures suitable for providing a film support for heat-fixing image development.

Apparatus 10 comprises a light producing element, preferably a high intensity laser beam 20 which is focused through a lens 21 to expose emulsion 18 on film 14. Exposure of emulsion 18 to the confined beam of light is used to record a latent image of a desired object on the silver halide layer. The high intensity focused light beam 20 is scanned over the surface to expose emulsion 18 to light for recording of the latent image. Other suitable sources of light energy for exposure of emulsion 18 may also be used in the practice of the present invention. A fixed image in the photosensitive material can be developed after exposure to light beam 20 by heating the exposed emulsion 18 at an elevated temperature, for example, in the range of about 210° F.–400° F. (99°–204° C.), for a sufficient time to provide the desired image. Heating of the emulsion 18 subsequent to exposure to light beam 20 is accomplished by a heater 22 as shown in FIG. 1 and detailed further in FIGS. 3a and 3b.

In accordance with a preferred embodiment of the invention, heater 22 comprises an open-ended, hollow housing 23 defining a chamber 24 into which gas is supplied. Housing 23 has a rectangular flow area in the preferred embodiment, but may also be formed to other suitable cross-sections depending upon such factors as space requirements and film width. A flow of air or other suitable gas is supplied into chamber 24 at entrance portion 25 of housing 23 by an air supplier 35. The flow rate of the supplied air is controlled by supplier 35 or other suitable air moving means having provisions to supply pressurized air to chamber 24 such that a "stiff air film" is produced to support film 12, as will be explained. Attached to the walls 26 of housing 23 and covering the aperture at the air exit portion 27 of housing 23 is a cap 28 of porous material such as, for example, ceramic or graphite, structurally supported by a rigid rib 30. The air flowing into chamber 24 passes through the interstices of porous cap 28 so that any irregular air currents are minimized. The air exiting cap 28 and supplied to film 14 is thereby substantially uniform in distribution.

Figure 3A:
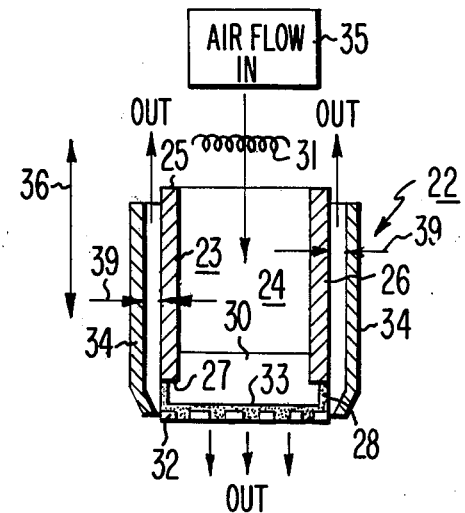
FIG. 3a is an enlarged cross-sectional elevation view in more detail of the heating element (22) illustrated in FIG. 1.
Figure 3B:
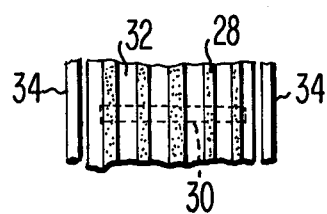

The air passing through cap 28 may be heated by a matrix of heater pads 32 imbedded within cap 28 and substantially flush with the outer surface of cap 28 as shown in FIGS. 3a and 3b. Heater pads 32 typically comprise relatively thin wires embedded in flat, sheet-like electrically insulative material. These wires are then connected to a source of electrical energy (not shown) to activate the heater pads 32 for the generation of heat. Pads 32 may also be located on the inner surface 33 of cap 28. The heated air distributed substantially uniformly by porous cap 28 provides a heat transfer rate from heater 22 to emulsion 18 which is substantially uniform over the surface of emulsion 18. In another embodiment of the invention, heater pads may be eliminated by heating the air by a suitable source, such as, for example, heating element 31, before flowing into chamber 24. It is also preferable that the air flow within chamber 24 be turbulent. The continuous mixing action of the turbulent air creates a more uniform air temperature than that resulting from laminar flow. However, even where the air flow within chamber 24 is turbulent, the flow of air exiting cap 28 is typically laminar due to the restrictive passage of air through the interstices of porous cap 28 and substantially uniform in distribution. A shroud 34 preferably having the form of an open-ended parallelepiped may be placed around the walls 26 of heater 22 such that there is a predetermined spacing 39 between the outer surfaces of walls 26 and the inner surface of shroud 34 to direct a portion of spent air away from film 14 through the spacing to further control the heating effect of the spent air. The position of heater 22 may be adjusted as shown by arrow 36 to accurately locate the position of heater 22 with respect to film 14.

Referring back now to FIG. 1, heater 22 is positioned so that a small gap, in the order of 0.001–0.002 inch (0.0254–0.0508 mm.) is provided between cap 28 of heater 22 and emulsion 18. Due to the relatively small gap between heater 22 and emulsion 18 and the substantially uniformly distributed air at a substantially uniform temperature, a mode of heat transfer is established which heats emulsion 18 more by conduction than by convection. In general, it has been empirically determined for the embodiment being described that when the gap between heater 22 and emulsion 18 is maintained relatively small, typically less than approximately 0.02 inch (0.508 mm.), heat transfer is effected more by conduction than by convection. Furthermore, the flowing air provides a gas bearing between heater 22 and film 14. With the air flow from blower 46, as will be explained, film 14 is supported and prevented from contacting heater 22 and blower 46.

To achieve the desired gas bearing support of film 14, a blower 46 is utilized to supply air to the bottom surface of film base 17. Similar to heater 22, blower 46 includes a porous member and an air supplier to supply a uniform distribution of air to film base 17. The air flow from blower 46 counteracts the air flow from heater 22, both air flows being supplied at substantially the same pressure, thereby suspending film 14 between heater 22 and blower 46. In accordance with one embodiment of the invention as empirically determined, a gas bearing through a graphite porous member can be established at a spacing of about 0.002 inch (0.0508 mm.) at an input air pressure of 20 pounds per square inch gage (psig) (1.406 kgs/square centimeter) and a housing 23 construction producing an air flow rate of approximately 0.23 standard cubic feet per minute (scfm) (0.109 liters/sec). However, input air pressure within a range of 10–30 psig (0.703–2.109 kgs/square centimeter) will establish a gas bearing of less than 0.004 inch (0.1016 mm.) for this particular configuration. The pressure of the air impinging upon the surfaces of the film is typically reduced to about 20–25% of the input air pressure as a result of the flow restriction through the graphite. Variations in the air due to pressure and temperature, and changes in housing geometric configuration and air flow rate may still be utilized to establish a suitable gas bearing, with spacings that may even exceed 0.004 inch (0.1016 mm.).

In a modified embodiment of the invention blower 46 is arranged with heating elements similar to those described for heater 22. In such an arrangement, blower 46 supplied heated air to base 17 at substantially the same temperature as the air from heater 22. Under these heating conditions, there will be essentially no temperature gradient across base 17. Such a process will allow for a minimal overall temperature of the development apparatus but the risk of weakening or warping base 17 will be increased. In a preferred embodiment of the invention, blower 46 is arranged to provide air to base 17 at a temperature lower than the air supplied to emulsion 18 by heater 22 after exposure to laser image beam 20 to reduce the average base 17 temperature and thereby minimize the warping or weakening effects of base 17.

Figure 4:
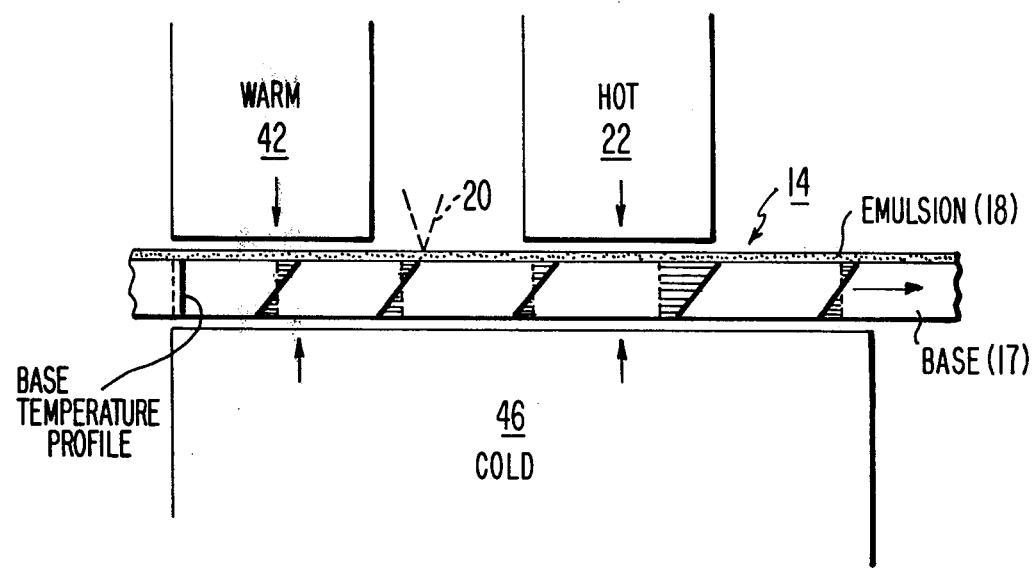
FIG. 4 is a schematic view depicting the profile of a thermal gradient across the base of a photographic film in accordance with a preferred embodiment of the invention.

In a further modified embodiment, emulsion 18 may be preheated prior to exposure to laser image beam 20 by a preheater 42 to minimize the amount of heat required by heater 22 to develop film 14. The temperature of air supplied by preheater 42 is maintained below 200° F. (93° C.) so that emulsion 18 and film base 17 are not damaged prior to exposure to laser beam 20. Preheater 42 is constructed with a porous member and air supplier similar to heater 22 and blower 46 to provide a substantially uniform distribution of air to the emulsion 18 layer of film 14. Blower 46 may be arranged to counteract the air flow from preheater 42 as well as the flow from heater 22 such that film 14 can be substantially evenly suspended and supported by a gas bearing. A typical thermal gradient for a blower arranged to provide cold air to base 17 is a system utilizing a preheater 42 as well as heater 22 is shown, for example, in FIG. 4. The desired thermal gradient for reducing the average film base 17 temperature is established across base 17 by cooling base 17 both prior to and after emulsion 18 has been exposed to laser beam 20.

Although the direction of air flowing from heater 22, blower 46 and preheater 42 is preferably perpendicular to film 14, it should be noted that the air flow may be directed at any suitable angle provided the flowing air is distributed substantially uniformly and at a pressure sufficient to establish the desired gas bearing.

Subsequent to the development of the photographic images, film 14 may be passed through a light box 38 which projects the images to a suitably arranged display of optics 40 for visual display on a screen or viewing surface (not shown).

In a particular system using a dry silver halide on a film base of polyethylene terephthalate, the photographic images are typically developed in the order of 30 seconds at 260° F. (127° C.), and in as little time as one second at a maximum temperature of 400° F. (204° C.). The temperature levels may be maintained by controlling the temperature of heating pads 32, or heating element 31 by adjusting the air flow areas of heater 22, blower 46 and preheater 42. The air flow rates may also be varied to achieve desirable thermal processing conditions.

According to the present invention, fixed photographic images may be developed in a film development system which utilizes heat-processing and which does not require application of external liquid developing agents. At present, black and white film is heat developable in a "dry" heat development process and may be utilized in the present invention. Color film is developable at present by "wet" processes which require the application of chemical agents for image fixation. It should be understood however, that the present invention is not limited to the processing of black and white film but may be utilized with any photographic film coated with a photothermally sensitized emulsion and developable in a dry heat process.

What is claimed is:

1. An apparatus for developing a fixed photographic image on a strip of photographic film, said film including a light-sensitive and heat-developable emulsion coated on a surface of a film base, comprising:
    means for exposing said film to an image of light to record thereby a latent image on said emulsion;
    film support means including gas distribution means responsive to a supply of flowing gas for uniformly distributing said gas to said light exposed film at a predetermined pressure, said gas distribution means being disposed adjacent to and on opposite surfaces of said film at a spacing such that said pressure of gas supplied to the respective surfaces of said film is sufficient to establish a gas bearing on said respective film surfaces to support said film while being passed through said development apparatus; and
    means for supplying flowing gas;
    said film support means including heating means for supplying said gas to said emulsion surface at a temperature that is at least equal to the temperature of the gas supplied to said base surface;
    said gas heating means including a matrix of heating pads disposed on the outer surface of said first and second gas distribution means;
    said spacing being sufficient to transfer heat between said heating means and the respective surfaces of said film;
    whereby said heated gas heats said film to develop said fixed photographic image.

2. An apparatus for developing a fixed photographic image on a strip of photographic film, said film including a light-sensitive and heat-developable emulsion coated on a surface of a film base, comprising:
    means for exposing said film to an image of light to record thereby a latent image on said emulsion;
    means for supplying flowing gas; and
    first and second film support means each including gas distribution means responsive to said flowing gas for uniformly distributing said flowing gas to the light exposed emulsion and film base surfaces, respectively, at substantially equal predetermined pressures, each of said gas distribution means being disposed adjacent to the respective surfaces of said film at a spacing such that said pressure of gas supplied to the respective surfaces of said film is sufficient to establish a gas bearing on said respective surfaces to support said film while being passed through said development apparatus;

said first and second film support means each including means respectively for heating said gas such that the gas supplied at said emulsion surface is at a temperature that is at least equal to the temperature of the gas supplied at said base surface;

said gas heating means including a matrix of heating pads disposed on the outer surface of said first and second gas distribution means;

said spacing being sufficient to transfer heat between each of said heating means and the respective surfaces of said film;

whereby said heated gas heats said film to develop said fixed photographic image.

3. An apparatus according to claim 2, wherein said heating means of said first and second film support means is arranged to supply gas to said respective film surfaces at substantially the same temperature.

4. An apparatus according to claim 2, wherein said heating means of said second film support means is arranged to supply gas to said base surface at a temperature less than the temperature of gas supplied at said emulsion surface, whereby a thermal gradient is established across said film base.

5. An apparatus according to claim 2, further including means for preheating said emulsion prior to exposure to said image of light at a temperature lower than that of said first film support means by a supply of gas to said emulsion surface at a predetermined pressure, and wherein said second film support means is adjusted to counteract the flow of said gas supplied by said preheater means to provide substantially equal pressure on the respective surfaces of said film for supporting said film.

6. An apparatus according to claim 2, wherein said spacing between said first and second gas distribution means and the respective surfaces of said film is in the order of 0.002 inch (0.0508 mm.), and wherein the pressure of gas supplied to each of said film support means is in the order of 20 pounds per square inch (gage) (1.406 kgs/square centimeter), and wherein said first and second gas distribution means are formed of graphite.

7. A method of developing a fixed photographic image on a strip of photographic film, said film including a light-sensitive and heat-developable emulsion coated on a surface of a film base, comprising the steps of:

exposing said film to an image of light to record thereby a latent image on said emulsion;

supporting said film by a gas bearing on the respective surfaces of said film, said gas bearing being established by gas distribution means responsive to a supply of flowing gas for uniformly distributing said flowing gas to said light exposed film at a predetermined pressure, said gas distribution means being disposed adjacent to and on opposite surfaces of said film at a spacing such that said pressure of gas supplied to the respective surfaces of said film is sufficient to establish said gas bearing;

heating said gas by a matrix of heating pads such that the temperature of gas supplied to said emulsion surface is at least equal to the temperature of gas supplied to said base surface;

said spacing being sufficient to transfer heat between said heating means and the respective surfaces of said film to develop said fixed photographic image.

8. A method according to claim 7 further including the step of selecting the temperature of gas supplied to said emulsion surface to be substantially the same as the gas supplied to said base surface.

9. A method according to claim 7 further including the step of selecting the temperature of gas supplied to said base surface at a temperature less than the temperature of gas supplied to said emulsion surface, whereby a temperature gradient is established across said film base.

10. A method according to claim 8 wherein said film is heated at a temperature of about 400° F. (204° C.) for a time in the order of one second.

11. A thermal processor in an apparatus for heat development of a fixed photographic image on a strip, said film including a latent image formed on an emulsion layer coated on a film base, comprising:

first and second housing means each arranged to receive a supply of gas;

means for supplying said gas to each housing;

first and second gas distribution means responsive to said respective gas flows for uniformly supplying said gas to said emulsion and film base surfaces, respectively, at substantially equal predetermined pressures, each of said gas distribution means being supported by said housing and disposed adjacent to the respective film surfaces at a spacing such that said pressure of gas supplied to the respective surfaces of said film is sufficient to establish a gas bearing on said respective surfaces to support said film while being passed through said processor; and means respectively for heating said gas supplied to said respective surfaces such that the temperature of gas supplied to said emulsion surface is at least equal to the temperature of gas supplied to said base surface;

said gas heating means including a matrix of heating pads disposed on the outer surface of said first and second gas distribution means;

said spacing being sufficient to transfer heat between each of said heating means and the respective surfaces of said film;

whereby said heated gas heats said film to develop said fixed photographic image.

12. A thermal processor according to claim 11, wherein said spacing between said first and second gas distribution means and the respective surfaces of said film is in the order of 0.002 inch (0.0508 mm.) and wherein the pressure of gas supplied to said housing means is in the order of 20 pounds per square inch (gage) (1.406 kgs/square centimeter), and wherein said first and second gas distribution means are formed of graphite.

* * * * *

UNITED STATES PATENT AND TRADEMARK OFFICE
CERTIFICATE OF CORRECTION

PATENT NO. : 4,198,145

DATED : April 15, 1980

INVENTOR(S) : Richard David Scott

It is certified that error appears in the above-identified patent and that said Letters Patent is hereby corrected as shown below:

In the Abstract: line 11, change "and" to --as--;

Signed and Sealed this

Eighteenth Day of November 1980

[SEAL]

Attest:

SIDNEY A. DIAMOND

Attesting Officer     Commissioner of Patents and Trademarks